(12) United States Patent
Crick

(10) Patent No.: US 9,933,940 B2
(45) Date of Patent: Apr. 3, 2018

(54) ACCESSIBLE KEYBOARD FOR MOBILE DEVICES AND TABLETS

(71) Applicant: Crick Software Ltd, Northampton (GB)

(72) Inventor: John Crick, Northampton (GB)

(73) Assignee: CRICK SOFTWARE LTD., Northampton (GB)

( * ) Notice: Subject to any disclaimer, the term of this patent is extended or adjusted under 35 U.S.C. 154(b) by 0 days.

(21) Appl. No.: 14/871,295

(22) Filed: Sep. 30, 2015

(65) Prior Publication Data
US 2016/0092106 A1    Mar. 31, 2016

Related U.S. Application Data

(60) Provisional application No. 62/058,040, filed on Sep. 30, 2014.

(51) Int. Cl.
*G06F 3/02* (2006.01)
*G06F 3/0488* (2013.01)
*G06F 3/023* (2006.01)

(52) U.S. Cl.
CPC ........ *G06F 3/04886* (2013.01); *G06F 3/0237* (2013.01)

(58) Field of Classification Search
None
See application file for complete search history.

(56) References Cited

U.S. PATENT DOCUMENTS

| | | | | |
|---|---|---|---|---|
| 2002/0027549 A1* | 3/2002 | Hirshberg | ............. | G06F 3/0234 345/168 |
| 2003/0224843 A1* | 12/2003 | Wang | .................. | G07F 17/3209 463/1 |
| 2008/0291171 A1* | 11/2008 | Shin | ....................... | G06F 3/0481 345/168 |
| 2008/0304890 A1* | 12/2008 | Shin | .................... | G06F 3/04886 400/61 |

(Continued)

OTHER PUBLICATIONS

Loli, Review: TenGO 2.0 and TenGO Thumb, Aug. 4, 2006, http://www.osnews.com/story/15389/Review_TenGO_2_0_and_TenGO_Thumb, p. 1.*

*Primary Examiner* — Ilana Spar
*Assistant Examiner* — Kirk Hermann
(74) *Attorney, Agent, or Firm* — Richards Patent Law P.C.

(57) ABSTRACT

An accessible virtual keyboard provided as a computer-readable medium including instructions, that when executed by a controller in communication with a user interface, cause the controller to: in response to a request from a running application, display a keyboard including selectable cluster keys via the user interface, wherein each cluster key is associated with a character set including two or more characters, wherein each displayed cluster key includes each character of the character set displayed within a boundary; in response to a selection of one of the cluster keys, display selectable individual keys of the character set associated with the selected cluster key via the user interface, wherein each individual key is associated with a single character of the character set associated with the selected cluster key; and, in response to a selection of one of the individual keys, provide the associated character as an input to the running application.

9 Claims, 8 Drawing Sheets

(56) References Cited

U.S. PATENT DOCUMENTS

| | | | |
|---|---|---|---|
| 2009/0088218 A1* | 4/2009 | Kim | G06F 3/0481 |
| | | | 455/566 |
| 2010/0197352 A1* | 8/2010 | Runstedler | G06F 3/0233 |
| | | | 455/566 |
| 2012/0206382 A1* | 8/2012 | Kusano | G06F 3/0236 |
| | | | 345/173 |
| 2012/0254318 A1* | 10/2012 | Poniatowskl | H04N 21/4788 |
| | | | 709/206 |
| 2014/0218297 A1* | 8/2014 | Mortel | G06F 3/0233 |
| | | | 345/168 |
| 2015/0012866 A1* | 1/2015 | Chang | G06F 3/04886 |
| | | | 715/773 |
| 2015/0100910 A1* | 4/2015 | Luo | G06F 3/04883 |
| | | | 715/771 |
| 2016/0282957 A1* | 9/2016 | Liu | G06F 3/0238 |

* cited by examiner

ACCESSIBLE KEYBOARD FOR MOBILE DEVICES AND TABLETS

BACKGROUND OF THE INVENTION

The present subject matter relates generally to a keyboard user interface for mobile devices and touchscreen computers. More specifically, the present invention relates to a mobile device keyboard using clustered keys for improved accessibility.

Using the keyboard on mobile devices is often difficult for users with a physical disability, users with low vision, and users using a smartphone while wearing gloves. Keyboard buttons on a mobile device are often small and close together, so many users who are otherwise able to use the basic functions of the device struggle to enter text.

Many users have experience with the difficulties of trying to use a mobile device while wearing touch-sensitive gloves. It's still easy to use basic phone functions, but the precision needed for typing makes it difficult and frustrating because it is so hard to target the small keys.

Users with more significant disabilities often have an even greater difficulty using the keyboard on mobile devices. For such users, tapping a desired keyboard button may be slow and difficult; double-tapping may be impossible. With a desktop or a laptop computer, challenged users may use a key guard or a special extra large keyboard, but those devices are not appropriate for use with mobile devices.

Smartphones and tablets are now a part of everyday life. Those who cannot use them miss out on a very important means of communication and participation in the community. As the population ages, an increasing number of people will face usability issues with mobile devices.

Existing mobile operating systems and other developers have attempted to address the problem of users with disabilities by providing switch access. With this method, each button on the screen is scanned in turn, and the user taps anywhere on the screen or presses an external switch (connected to the device via Bluetooth) when the desired button or key is highlighted. Switch access generally involves a single switch requires the user to press their switch at the correct time (when the required item is highlighted). This is difficult for a significant number of users, for example, some people with cerebral palsy get very tense while waiting for the scan, and then hit the switch too soon or too late. Those users then have to go through the whole process again to select the delete key and correct their error. In short, switch access is unnecessarily complicated and very slow, requiring many switch presses to select a single letter.

Thus, there is a need for systems and methods that provide disadvantaged users with improved accessibility on mobile devices. Accordingly, there is a need for accessible keyboard applications for mobile devices and tablets, as described herein.

BRIEF SUMMARY OF THE INVENTION

To meet the needs described above and others, the present disclosure provides accessible keyboard applications for mobile devices and tablets.

To meet the needs described above and others, the present disclosure provides systems, methods, and computer-readable media for providing accessible keyboard applications for mobile devices and tablets.

By providing a keyboard that includes clustered keys, the accessible keyboard application overcomes the limitations of previous keyboards that required precise entry of keystrokes. Additionally, by providing a keyboard with large form predicted words, the accessible keyboard avoids greatly increasing the number of keystrokes needed to enter a word.

In one example, the accessible keyboard application is a third-party keyboard application that may interface with the operating system of a mobile device. For example, the accessible keyboard application may be provided as an Android application, or an iOS application. The accessible keyboard application may replace the operating system's native keyboard application across all native and third party applications on the mobile device. Thus, when the user accesses the keyboard when using a running application, the user may be presented with a keyboard of the accessible keyboard application.

In an embodiment, when displaying a cluster keyboard, the accessible keyboard application may cluster the keys of a standard keyboard layout into seven large keys, rather than the thirty or more small keys present on the standard keyboard. The larger key clusters are large enough to be seen by users with low vision. For example, a user familiar with the qwerty layout will know which cluster to tap even if they cannot see the individual letters until the cluster is opened.

In an embodiment of a keyboard with clustered keys, there are five clusters and two hot keys for a total of seven large keys. Also present may be a "globe" key; it is a required key on the iOS that enables the user to switch to other keyboards on the device. Each cluster key may contain up to seven characters. The rows of each cluster may be offset slightly to reflect the standard keyboard and to reduce miss-hits during use. When a cluster key is tapped, there is no input to the device; instead, the cluster opens to fill the whole keyboard area. An animation showing the opening of the cluster may be provided to indicate to the user that a cluster has been opened.

When a cluster key is tapped, a key for each character of the cluster may be displayed as an individual key for that character. The individual key may be enlarged relative to the presentation of the character on the clustered keyboard, but are maintained in the same relative location. In an embodiment, the characters of the clustered keys may be presented in the same layout as standard qwerty keyboard, permitting the user to easily locate a desired character. For example, a user may open a cluster key for the characters 'q,' 'w,' 'e,' 'a,' 's,' and 'd.' If the user has opened a cluster by mistake, she may tap the "x" button to close it. If a capital letter is required, the user may tap a shift button to toggle the letters in the cluster to upper case. Once the user has chosen a desired letter, for example, 'a,' the user is returned to the full cluster keyboard and the letter is passed to a running application as an input.

Although described in the embodiment herein as having five clusters of keys, those skilled in the art will understand that fewer or greater number of clusters may be used. It is contemplated that in some embodiments there may be as few as two clusters, and in other embodiments, there may be more clusters than five, up to the number of keys on the device. Nothing in this disclosure should be read to limit the number of clusters to five.

Nevertheless, while the number of clusters and the number of words in each cluster may be varied in some embodiments, the described embodiment of five clusters of six or seven keys apiece is a preferred embodiment. To explain, consider if the number of clusters were to be reduced. Then, the numbers of keys present when each cluster is opened must necessarily be increased. With more keys in a cluster, the size of each key must be reduced, negatively affecting the accessibility of each key. Accordingly, it is believed that clustering of five clusters of six or seven keys each is one example of a near-optimal balance.

Additionally, it is appreciated that one might lay the keys out alphabetically in rows, and then cluster the keys, but testing has shown that a standard qwerty layout was much more intuitive to use. Likewise, testing has shown it beneficial to position the characters within the cluster keys in the same way they are positioned in relation to each other as in a standard keyboard. This makes it easy to find the desired letter, and offsetting the two rows makes miss-hits less likely. Finally, testing has shown that having often-used keys such as enter and shortcuts (to other keyboards) within a cluster felt frustrating, so these two items were placed onto hot keys to permit access with a single tap.

The accessible keyboard application may use word prediction to increase the rapid input of desired words. Consider a user desiring to input the word "waiting." After the user has successfully inputted the letter 'w,' the word prediction algorithm immediately begins suggesting candidate words, such as "watching," "with," and "winning."

Candidate words may be predicted using the existing inputted words and characters. For example, the prediction algorithm may include an n-gram model that predicts likely words given the previously inputted words, characters, or both. The model may be pre-programmed into the accessible keyboard application. Additionally, or alternatively, the candidate words may be predicted by an adaptive model that is updated based on the frequency by which each word was previously inputted by the user when using the accessible keyboard application.

The candidate words may be displayed above the keyboard area. The number of candidate words presented may be preprogrammed and chosen to optimize the size of the button containing each candidate word. For example, the number of candidate words may be three. In other embodiments, other numbers of candidate words may be used, as will be appreciated by one of ordinary skill in the art. Alternatively, the number of candidate words presented may be optimized on-the-fly. This optimization may balance increasing the number of choices with the need to maintain sufficient large buttons. For example, when the user has inputted "th," the most likely words may be "this," "that," "them," "their." Although each of the candidate words may fit in the candidate word space, to do so may require buttons smaller than a predetermined button size. Accordingly, the accessible keyboard application may limit the candidate words to "this," "that", and "their," for example. As shown below, the user may select from the candidate words to input a complete word.

The accessible keyboard application may include multiple keyboards in addition to the standard alphabetical keys. For example, a Numeric keyboard and Symbols keyboard may contain the same characters as on standard keyboards for numbers and symbols with the numbers and symbols joined in clusters. Like the alphabetical keys keyboard, the numbers and symbols may be combined into five clusters of numbers and symbols along with two hot keys.

Each of the hot keys may provide a direct, single-tap access to an important function. Additionally, each hot key may be specified in a settings menu, where the user may choose from various functions for the hot keys. The available functions may be different for each hot key. For example, the user may choose to have the left key represent the function or: opening a shortcuts keyboard; opening a numeric keyboard; opening a symbols keyboard; etc. Likewise, the user may choose to have the right hot key represent: a return key; a spacebar; a delete key; etc. Any of the listed options for the left and right hot key that is not chosen for a hot key may be included functions in a cluster. For example, if the right Hot Key is set up as "Delete", then the return button may be moved to the position formerly occupied by the delete key.

The accessible keyboard application may include a shortcut keyboard to give the user fast access to, for example, up to thirty-six customizable phrases. This enables the user to write a specified phrase with just one tap. For example, the left hot key may be set up by default to open the shortcuts keyboard. The shortcuts keyboard may include a number of phrases, for example, six phrases may be displayed. When a phrase key is tapped, the whole phrase is input.

Multiple pages of phrases may be available. In one embodiment, the user may swipe forward to access the next six phrases, and swipe backward to access the previous six. The user may configure phrases; for example, on the iPhone and iPad, this may be done in the device settings. Alternatively, the accessible keyboard application may include preprogrammed phrases. In yet another embodiment, the accessible keyboard application may include the most popular phrases inputted by the user over a period of use.

The accessible keyboard application may be customizable to enhance accessibility and ease of use. For example, the user may select from various colour options, to help users with low vision. The colour options may include colouring each cluster differently, colouring each character differently, using colour to enhance contrast, etc. Additionally, the accessible keyboard application may include sound options to help users with low vision. For example, a different sound may be played when a cluster is tapped relative to when a letter key is tapped. Further, the application may include a predictor size option. For example, while words in the predictor are always large, there may be an option to increase it further. Finally, the application may be customizable to include alternative keyboard layouts and fonts.

Additionally, the accessible keyboard application may contains all the features users have come to expect in smartphones and tablets, including word prediction, automatic capitalization after full stop, etc. Each of these features all cut down the number of taps necessary to input characters and words.

In an embodiment, a computer-readable medium for providing an accessible keyboard includes instructions, that when executed by a controller in communication with a user interface, cause the controller to: in response to a request from a running application, display a keyboard including selectable cluster keys via the user interface, wherein each cluster key is associated with a character set including two or more characters, wherein each displayed cluster key includes each character of the character set displayed within a boundary; in response to a selection of one of the cluster keys, display selectable individual keys of the character set associated with the selected cluster key via the user interface, wherein each individual key is associated with a single character of the character set associated with the selected cluster key; and, in response to a selection of one of the individual keys, provide the associated character as an input to the running application.

In an embodiment, the characters displayed within each cluster key are positioned according to a QWERTY keyboard layout. In an embodiment, a number of the cluster keys is five.

In an embodiment, a first character set includes the characters 'q' and 'a,' a second character set includes the characters 't' and 'g,' a third character set includes the characters 'p' and 'l,' a fourth character set includes the characters 'z' and 'x,' and a fifth character set includes the characters 'n' and 'm.' In another embodiment, a first character set includes the characters 'q,' 'w,' 'e,' 'a,' 's,' and 'd,' a second character set includes the characters 'r,' 't,' 'y,' 'u,' 'f,' 'g,' and 'h,' a third character set includes the characters 'i,' 'o,' 'p,' 'j,' 'k,' and 'l,' a fourth character set includes the characters 'z,' 'x,' and 'c,' and a fifth character set includes the characters 'v,' 'b,' 'n,' and 'm.'

In an embodiment, the computer-readable medium for providing an accessible keyboard includes further instructions that cause the controller to: display selectable buttons, wherein each selectable button is associated with a multi-word phrase and the multi-word phrase is displayed within the selectable button; and in response to a selection of one of the selectable buttons, provide the multi-word phrase associated with the selected selectable button as an input to the running application.

In an embodiment, the computer-readable medium for providing an accessible keyboard includes further instructions that cause the controller to: provide a default function for a configurable hot key; receive a desired function for the configurable hot key; and update a cluster key to include the default function.

In an embodiment, a computer-readable medium for providing an accessible keyboard includes instructions, that when executed by a controller in communication with a user interface, cause the controller to: in response to a request from a running application, display a keyboard including selectable cluster keys via the user interface, wherein each cluster key is associated with a character set including two or more characters, wherein each displayed cluster key includes a displayed, non-selectable character for each character of the character set; in response to a selection of one of the cluster keys, display selectable individual keys of the character set associated with the selected cluster key via the user interface, wherein each individual key is associated with a single character of the character set associated with the selected cluster key; and, in response to a selection of one of the individual keys, provide the associated character as an input to the running application.

In an embodiment, the characters displayed within each cluster key are positioned according to a QWERTY keyboard layout. In an embodiment, a number of the cluster keys is five.

In an embodiment, a first character set includes the characters 'q' and 'a,' a second character set includes the characters 't' and 'g,' a third character set includes the characters 'p' and 'l,' a fourth character set includes the characters 'z' and 'x,' and a fifth character set includes the characters 'n' and 'm.' Additionally, in an embodiment, a first character set includes the characters 'q,' 'w,' 'e,' 'a,' 's,' and 'd,' a second character set includes the characters 'r,' 't,' 'y,' 'u,' 'f,' 'g,' and 'h,' a third character set includes the characters 'i,' 'o,' 'p,' 'j,' 'k,' and 'l,' a fourth character set includes the characters 'z,' 'x,' and 'c,' and a fifth character set includes the characters 'v,' 'b,' 'n,' and 'm.'

In an embodiment, the computer-readable medium for providing an accessible keyboard includes further instructions that cause the controller to: display selectable buttons, wherein each selectable button is associated with a multi-word phrase and the multi-word phrase is displayed within the selectable button; and in response to a selection of one of the selectable buttons, provide the multi-word phrase associated with the selected selectable button as an input to the running application.

In an embodiment, the computer-readable medium for providing an accessible keyboard includes further instructions that cause the controller to: provide a default function for a configurable hot key; receive a desired function for the configurable hot key; and update a cluster key to include the default function.

In an embodiment, a system for providing an accessible keyboard includes: a user interface; a controller in communication with the user interface; and a computer-readable medium including instructions, that when executed by the controller, cause the controller to: in response to a request from a running application, display a keyboard including selectable cluster keys via the user interface, wherein each cluster key is associated with a character set including two or more characters, wherein each displayed cluster key includes each character of the character set displayed within a boundary; in response to a selection of one of the cluster keys, display selectable individual keys of the character set associated with the selected cluster key via the user interface, wherein each individual key is associated with a single character of the character set associated with the selected cluster key; and, in response to a selection of one of the individual keys, provide the associated character as an input to the running application.

In an embodiment, the characters displayed within each cluster key are positioned according to a QWERTY keyboard layout. In an embodiment, a number of the cluster keys is five. In an embodiment, a first character set includes the characters 'q' and 'a,' a second character set includes the characters 't' and 'g,' a third character set includes the characters 'p' and 'l,' a fourth character set includes the characters 'z' and 'x,' and a fifth character set includes the characters 'n' and 'm.'

In an embodiment, the system for providing an accessible keyboard includes further instructions that cause the controller to: display selectable buttons, wherein each selectable button is associated with a multi-word phrase and the multi-word phrase is displayed within the selectable button; and in response to a selection of one of the selectable buttons, provide the multi-word phrase associated with the selected selectable button as an input to the running application.

In an embodiment, the system for providing an accessible keyboard includes further instructions that cause the controller to: provide a default function for a configurable hot key; receive a desired function for the configurable hot key; and update a cluster key to include the default function.

An object of the invention is to provide a solution to the difficulty of existing keyboards by providing big keys with a large target area, no double tapping, almost no swiping, and a minimal learning curve.

An advantage of the invention is that it provides a fast means of typing for anyone who struggles with a standard keyboard with no learning necessary.

Another advantage of the invention is that it provides a keyboard that only requires two taps to type a lower case letter, compared to many carefully timed switch presses with the switch access method.

A further advantage of the invention is that it provides a keyboard that is accessible by all users except for those with a very severe physical disability, and those who are blind or have extremely low vision.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
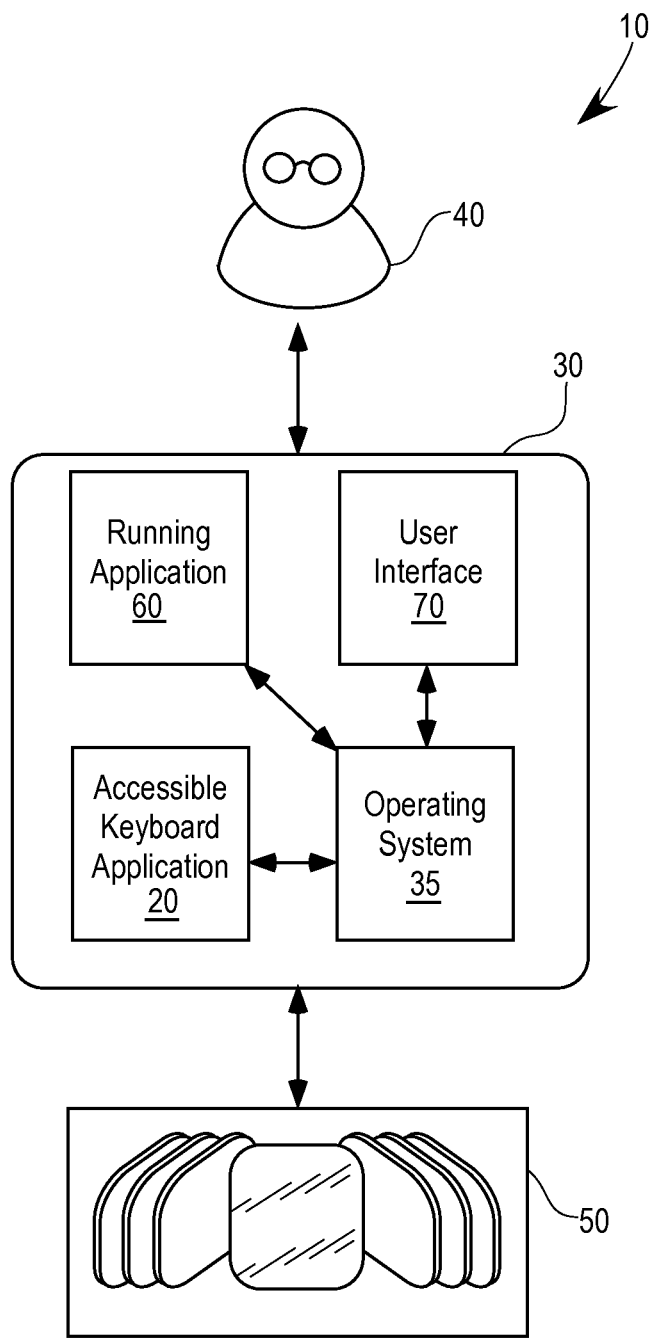
FIG. 1 is a diagram illustrating an example of an accessible keyboard system.

FIG. 1 illustrates an example of an accessible keyboard system 10. As shown in FIG. 1, the accessible keyboard system 10 may include an accessible keyboard application 20 that interfaces with the operating system 35 of a user device 30. A user 40 may install the accessible keyboard application 20 using standard installation procedures.

Figure 2:
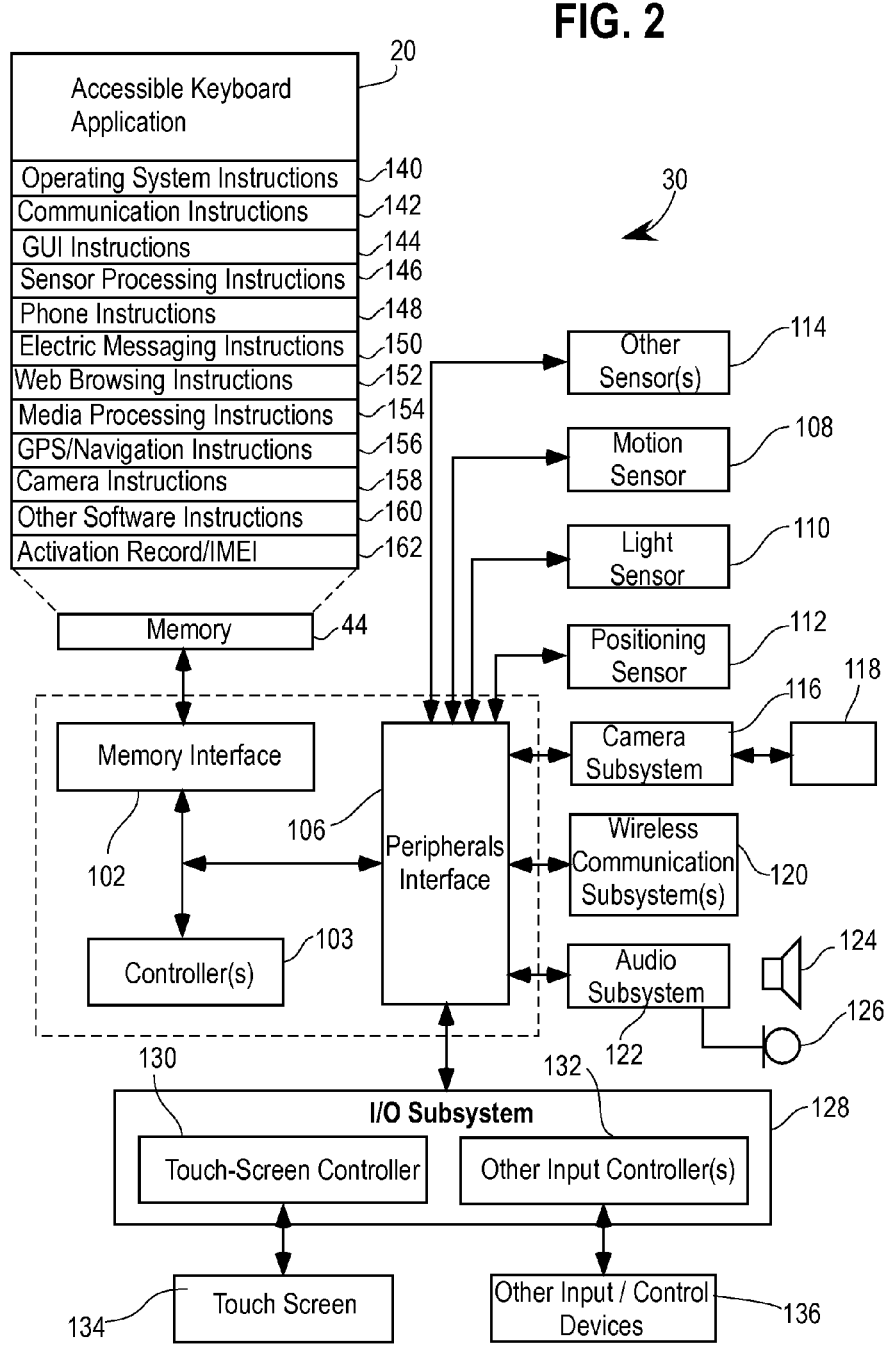
FIG. 2 is a schematic diagram illustrating an example user device of the tracking system.

For example, the accessible keyboard application 20 may be stored on a non-transitory computer-readable medium of an app store 50, such as those provided by Google® or Apple®. The user 40 may access to the app store 50 to download and install the accessible keyboard application 20 to local memory 44 (FIG. 2). When using the user device 30, the user 40 may request to input information into a running application 60. The running application 60 may request an input from the operating system 35, which, in turn, requests the accessible keyboard application 20 to display a keyboard 310 (FIG. 3) on a user interface 70. Using the keyboard 310, the user 40 may input characters, numerals, whole words and phrases, etc. The accessible keyboard system 10 may provide the resulting input to the running application 60 via the operating system 35.

As shown in FIG. 2, the user device 30 may be a mobile device, such as a smartphone, running the accessible keyboard application 20 to provide the functionality described herein. The user device 30 may include wireless communication subsystem 120 to communicate with remote servers, such as the app store 50.

Although the accessible keyboard application 20 shown in present examples is adapted for use with a touchscreen 134, in other embodiments, the accessible keyboard application 20 may use other forms of input. For example, the accessible keyboard application 20 may be run on a standard PC using an input device other than a touchscreen 134, such as a mouse or trackerball. This is useful for anyone who is unable to use a physical keyboard but can use a pointing device to move the standard Windows pointer on the screen. For example, this may be particularly valuable for eye-gaze users, who control a pointer with eye movement. Accordingly, it will be understood to those of skill in the art that the accessible keyboard application 20 is not limited to use with a touchscreen 134.

In one example, the accessible keyboard application 20 is a third-party keyboard application that may interface with the operating system 35 of a mobile device. For example, the accessible keyboard application 20 may be provided as an Android application, or an iOS application. The accessible keyboard application 20 may replace the operating system's native keyboard application across all native and third party applications on the user device 30.

Figure 3:
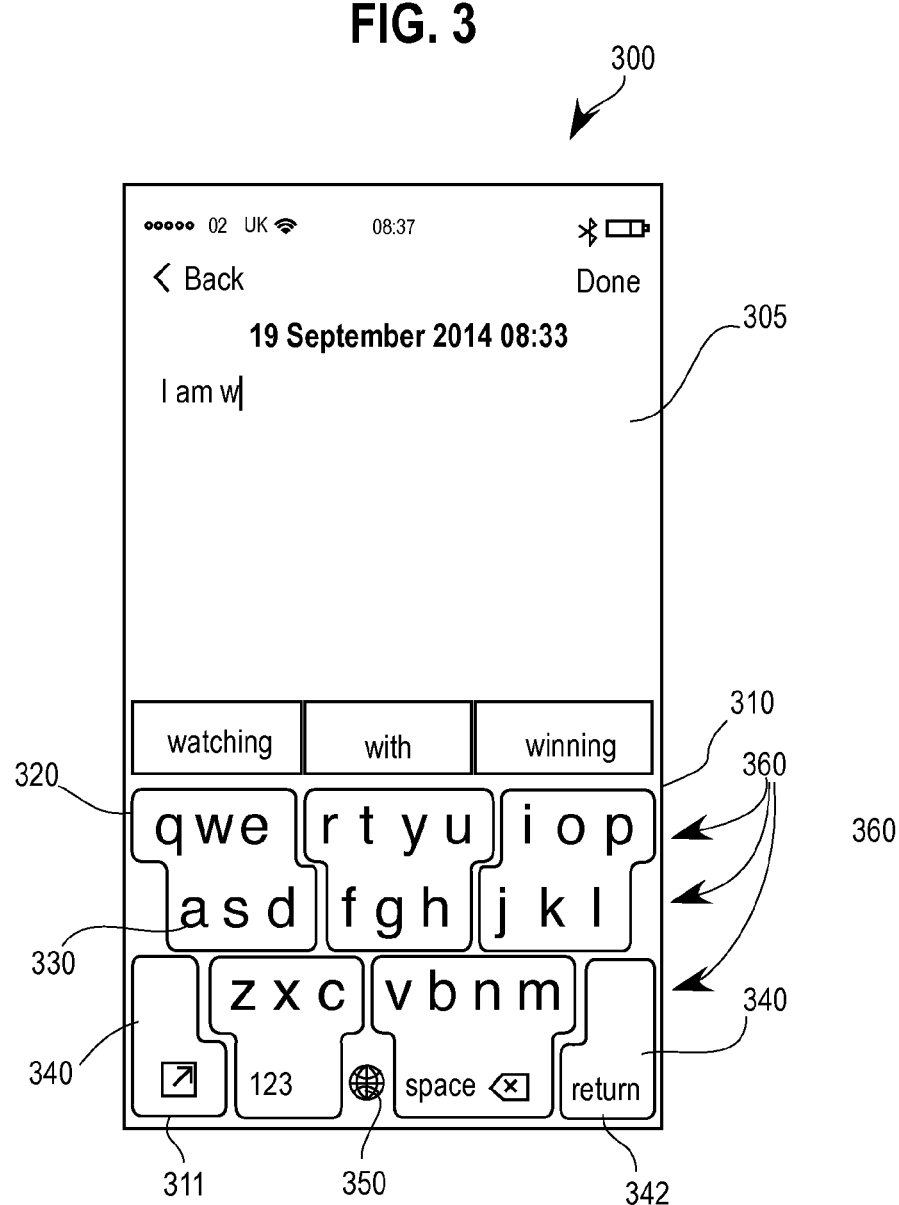
FIG. 3 is an example keyboard of the accessible keyboard system displayed on a user interface to permit a user to provide input to a running application.

As shown in FIG. 3, when an input is requested by a running application 60, the user interface 70 may display a running application portion 305 and the keyboard 310 of the accessible keyboard application 20. The accessible keyboard application 20 may cluster the keys of a standard keyboard layout into seven large cluster keys 320, rather than the thirty or more small keys present on the standard keyboard. The larger cluster keys 320 may be large enough to be seen by users with low vision, even if the individual characters prove difficult to make out. The cluster keys 320 may include contrasting colors to set them off from the surrounding background. For example, in an embodiment, a cluster key 320 may be colored white while the background may be a gray, black, or other contrasting color. Further, each cluster key 320 may include a high-visibility border, such as a dark contrasting color to contrast with the color of the cluster key 320.

The cluster keys 320 may incorporate the traditional QWERTY layout. Thus, a user 40 familiar with the QWERTY layout may know which cluster key 320 to tap even if he or she cannot see the individual letters until the cluster key 320 is opened.

As shown in FIG. 3 in the cluster screen 300, there are five cluster keys 320 and two hot keys 340 for a total of seven large cluster keys 320. Also shown is a globe key 350; it is a required key on some operating systems 35 that enables the user 40 to switch to other keyboards on the user device 30. As shown, each key cluster 320 may contain up to seven characters 330.

Figure 4:
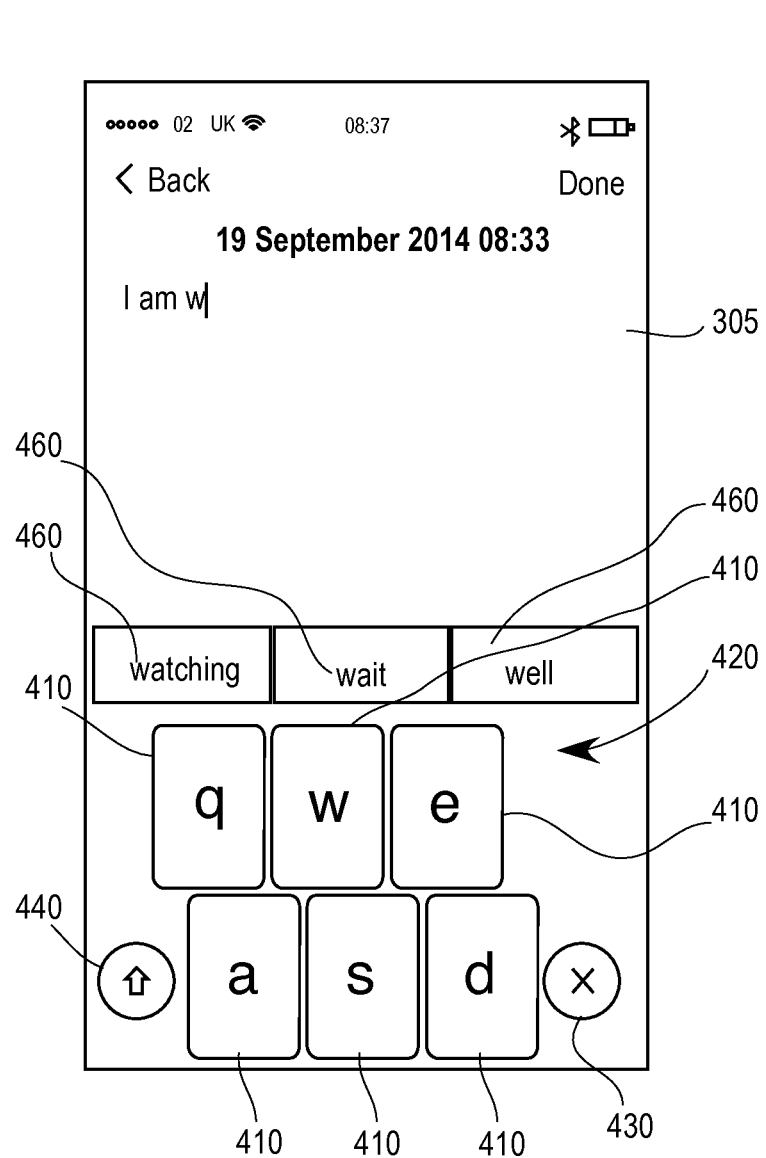
FIG. 4 illustrates an open cluster screen of the accessible keyboard system.

A cluster key 320 may span one or more rows 360 of characters 330. To reflect the standard keyboard and to reduce miss-hits during use, the rows 360 of each cluster key 320 may be offset slightly. In an embodiment, the displayed characters 330 in a cluster key 320 are not individually selectable. To indicate that the cluster key 320 is not selectable, in an embodiment as shown in FIG. 3, the cluster key 320 may include a border around the characters 330. It is contemplated that in other embodiments, the border may be omitted. When a cluster key 320 is tapped, the cluster opens to fill the whole keyboard area as shown in FIG. 4. An animation showing the opening of the cluster key 320 may be provided to indicate to the user 40 that a cluster key 320 has been opened.

Shown in FIG. 4 is an example of a cluster key 320 that has been opened by the user 40. Each cluster key 320 is associated with a character set 420 defining the characters 330 included in that cluster key 320. As shown in this open cluster screen 400, the individual keys 410 of the character set 420 are enlarged but are maintained in the same relative location as a standard QWERTY keyboard, permitting the user 40 to easily locate the desired letter. In the example, the user 40 has opened the top-left ("qweasd") cluster key 320 of the previous figure. If the user 40 has opened the cluster by mistake, she may tap a close button 430 to close it. If a capital letter is required, the user 40 may tap a shift button 440 to toggle the letters on the open cluster screen 400 to upper case. Once the user 40 has chosen a desired individual key 410, she is returned to the cluster screen 300.

It will be understood by those of ordinary skill in the art that the characters 330 of a character set 420 may be grouped in various ways. For example, in an embodiment, a first character set includes the characters 'q' and 'a,' a second character set includes the characters 't' and 'g,' a third character set includes the characters 'p' and 'l,' a fourth character set includes the characters 'z' and 'x,' and a fifth character set includes the characters 'n' and 'm.' Other characters 330, such as 'e,' 'r,' 'i,' etc., may be grouped into the various characters sets in various ways to create cluster keys 320. For example, in an embodiment, a first character set includes the characters 'q,' 'w,' 'e,' 'a,' 's,' and 'd,' a second character set includes the characters 'r,' 't,' 'y,' 'u,' 'f,' 'g,' and 'h,' a third character set includes the characters 'i,' 'o,' 'p,' 'j,' 'k,' and 'l,' a fourth character set includes the characters 'z,' 'x,' and 'c,' and a fifth character set includes the characters 'v,' 'b,' 'n,' and Although described in the embodiment herein as having seven keys including five cluster keys 320, those skilled in the art will understand that fewer or greater number of cluster keys 320 may be used. It is contemplated that in some embodiments there may be as few as two cluster keys 320, and in other embodiments, there may be more clusters than five, up to the number of keys on the device. Nothing in this disclosure should be read to limit the number of cluster keys 320 to five, nor the total number of keys to seven.

Nevertheless, while the number of cluster keys 320 and the number of characters 330 in each character set 420 may be varied in some embodiments, the described embodiment of five cluster keys 320 of six or seven characters apiece is a preferred embodiment. To explain, consider if the number of cluster keys 320 were to be reduced. Then, the numbers of individual keys 410 present when each cluster key 320 is opened must necessarily be increased. With more individual keys 410 for each cluster key 320, the size of each individual key 410 must be reduced, negatively affecting the accessibility of each individual key 410. Accordingly, it is believed that clustering of five cluster keys 320 to access six or seven individual keys 410 each is one example of a near-optimal balance.

Additionally, it is appreciated that one might lay out the characters 330 alphabetically in rows in the cluster keys 320, but testing has shown that a standard qwerty layout was much more intuitive to use. Likewise, testing has also shown it beneficial to position the characters 330 in the cluster keys 320 with the character rows 360 offset slightly in relation to each other as in present in a standard keyboard. This makes it easier for the user 40 to find the desired letter, because offsetting the rows makes miss-hits less likely. Finally, testing has shown that having often-used keys such as Enter and Shortcuts within a cluster felt frustrating, so these two items were placed onto hot keys 340 to permit access with a single tap.

The accessible keyboard application 20 may use word prediction to increase the rapid input of desired words. In FIG. 4, the user 40 desires to input the word "waiting." As shown, after the user 40 has successfully inputted the letter 'w,' a word prediction algorithm immediately begins suggesting candidate words 460.

Candidate words 460 may be predicted using the existing inputted words and inputted characters. For example, the prediction algorithm may include an n-gram model that predicts likely words given the previously inputted words, characters, or both. The model may be pre-programmed into the accessible keyboard application 20. Additionally, or alternatively, the candidate words 460 may be predicted by an adaptive model that is updated based on the frequency by which each word was previously inputted by the user 40 when using the accessible keyboard application 20.

The list of candidate words 460 may be further refined when a cluster keys 320 is opened, to reflect the available characters in the character set 420 for the open cluster key 320. For example, after the user has entered "I would like a cup of", the candidate words 320 may be "coffee, tea, hot, water". If the user 40 now opens the top-left cluster key 320, the candidate words 320 may be updated to "water, warm, something, wine" because these are appropriate words that begin with the letters in the character set 420.

The candidate words 460 may be displayed as buttons above the keyboard 310. The number of candidate words 460 presented may be preprogrammed and chosen to optimize the size of the button containing each candidate word 460. For example, the number of candidate words 460 may be three. In other embodiments, other numbers of candidate words 460 may be used, as will be appreciated by one of ordinary skill in the art. Alternatively, the number of candidate words 460 presented may be optimized on the fly. This optimization may balance increasing the number of choices with the need to maintain sufficient large buttons. For example, when the user 40 has inputted "th," the most likely words may be "this," "that," "them," "their." Although each of the candidate words may fit in the candidate word space, to do so may require buttons smaller than a predetermined button size. Accordingly, the accessible keyboard application may limit the candidate words 460 to "this," "that", and "their," for example. As shown below, the user 40 may select from the candidate words 460 to input a complete word.

Figure 5:
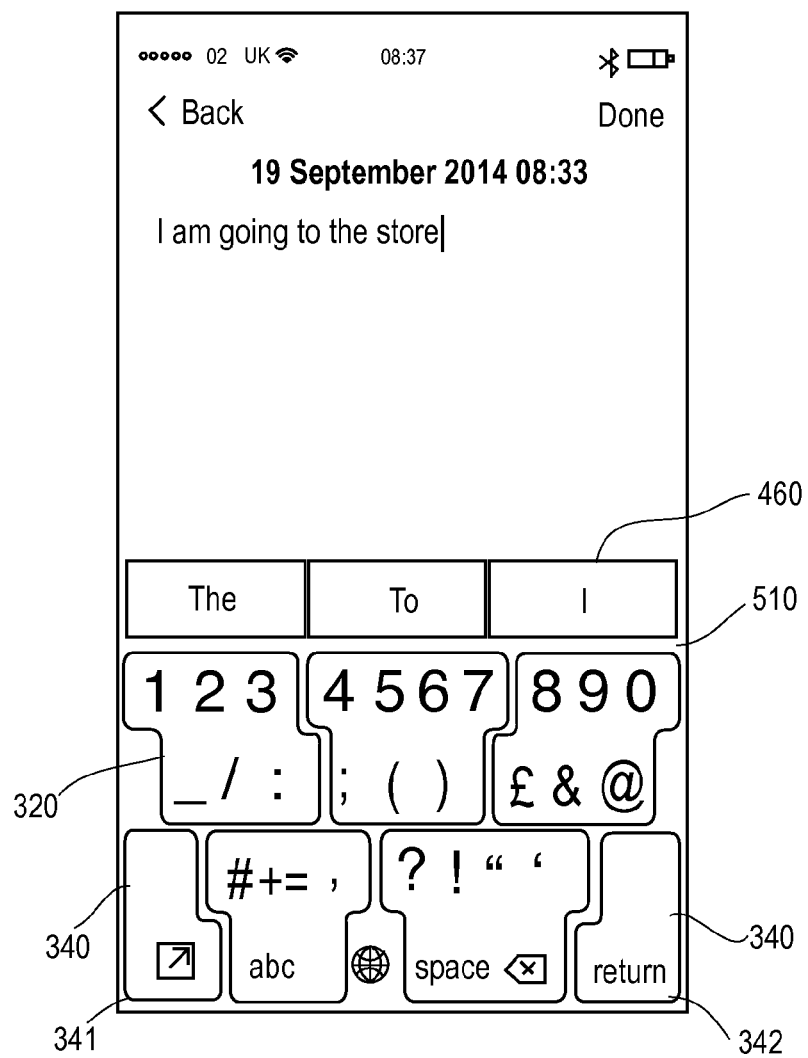
FIG. 5 illustrates a numeric keyboard of the accessible keyboard system to permit the user to input numbers and symbols.
Figure 6:
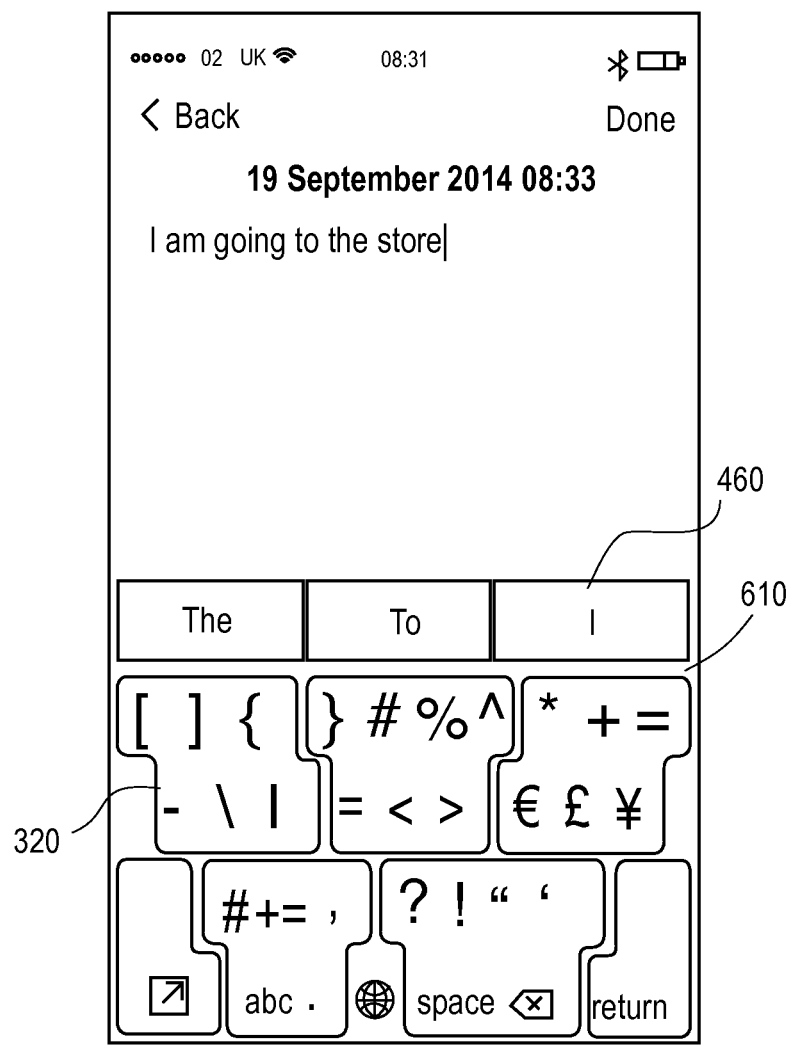
FIG. 6 illustrates a symbols keyboard of the accessible keyboard system to permit the user to input various symbols.

The accessible keyboard application 20 may include multiple keyboards in addition to the standard alphabetical keys of the keyboard 310. For example, as shown in FIG. 5, a numeric keyboard 510 may contain the same characters 330 as are present on a standard keyboard for numbers and symbols, but with the numbers and symbols joined into cluster keys 320. Likewise, as shown in FIG. 6, a symbols keyboard 610 may provide access to additional symbols joined into cluster keys 320.

Like the alphabetical keyboard 310, the numeric keyboard 510 and symbols keyboard 610 may include number and symbol characters 330 combined into five cluster keys 320 of numbers and symbols along with two hot keys 340.

Each of the hot keys 340 may provide a direct, single-tap access to an important function. The function of each hot key 340 may be specified in a settings menu, so that the user 40 may choose from various functions for the hot keys 340. The available functions may be different for each hot key 340. For example, the user 40 may choose to have the left hot key 341 represent: open the Numeric Keyboard 510; a symbols keyboard 610; a Shortcuts keyboard 710 (FIG. 7); etc. Likewise, the user 40 may choose to have the right hot 342 key represent: return; space; delete; etc. Any of the listed options for the left hot key 341 and the right hot key 342 that is not chosen for a hot key 340 may be included as functions in a cluster key 320. For example, if the right hot key 342 is set up as "Delete", then the Return function moves to the position of the delete key in FIG. 3.

Figure 7:
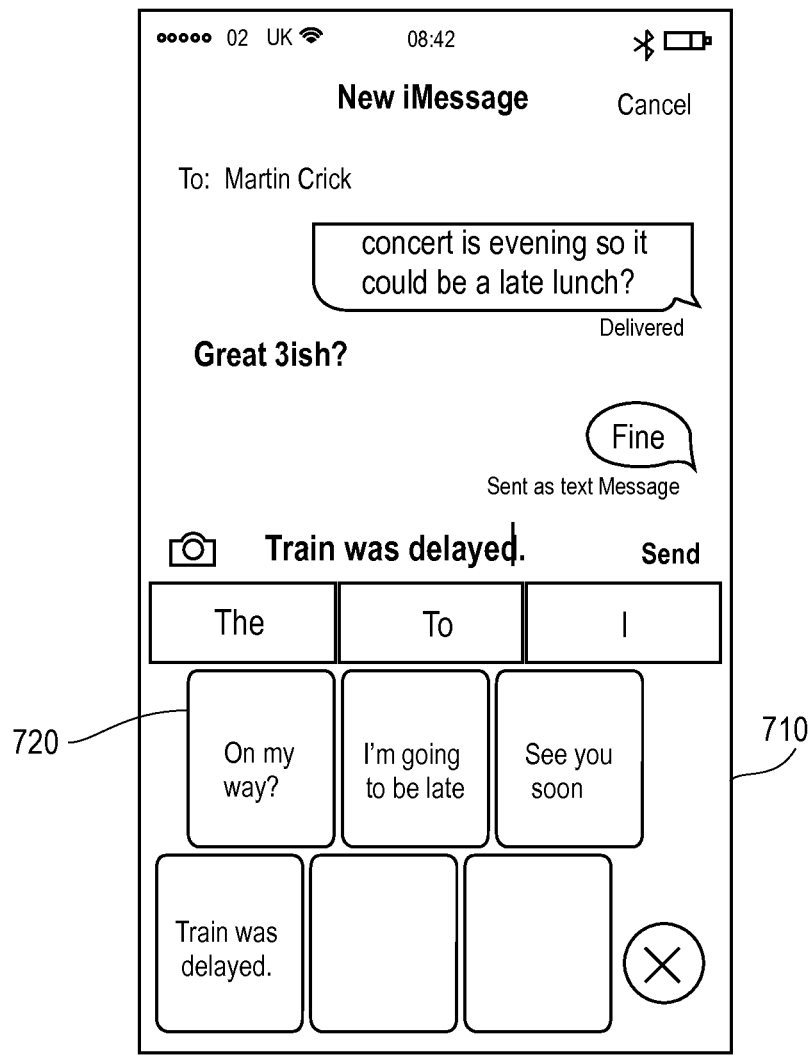
FIG. 7 illustrates a shortcut keyboard of the accessible keyboard system to give the user fast access to buttons including customizable phrases.

Turning to FIG. 7, the accessible keyboard application 20 may include a shortcut keyboard 710 to give the user fast access to buttons including customizable phrases 720. This enables the user 40 to write a specified phrase 720 with just a few taps. For example, the left hot key 341 may be set up by default to open the shortcuts keyboard 710. As shown in the figure below, the shortcuts keyboard 710 may include a number of phrases 720; for example, six phrases 720 are shown in the FIG. 7. When a phrase 720 is tapped, the whole phrase 720 is input. Multiple pages of phrases 720 may be available. In one embodiment, the user 40 may swipe forward to access the next six phrases 720, and swipe backward to access the previous six. Phrases 720 may be configured by the user 40—for iPhone and iPad, this is done in the device settings. Alternatively, the accessible keyboard application 20 may include preprogrammed phrases 720.

In yet another embodiment, the accessible keyboard application 20 may include the most popular phrases 720 inputted by the user 40 over a period of use. For example, in an embodiment, the accessible keyboard application 20 may track the inputs provided by a user 40 over time. If a phrase is inputted more than a predetermined number of times, the phrase may be added as one of the customizable phrases 720.

The accessible keyboard application 20 may be customizable to enhance accessibility and ease of use. For example, the user 40 may select from various colour options, to help users 40 with low vision. The colour options may include colouring each cluster differently, colouring each character differently, using colour to enhance contrast, etc. In one embodiment, a first cluster key 320 may be coloured red Additionally, the accessible keyboard application 20 may include sound options to help users with low vision. For example, a different sound may be played when a cluster is tapped relative to when a letter key is tapped. Further, the accessible keyboard application 20 may include a candidate words size option. For example, while words in the candidate words 460 are always large, there may be an option to increase their size further. Finally, the accessible keyboard application 20 may be customizable to include alternative keyboard layouts and fonts.

Figure 8:
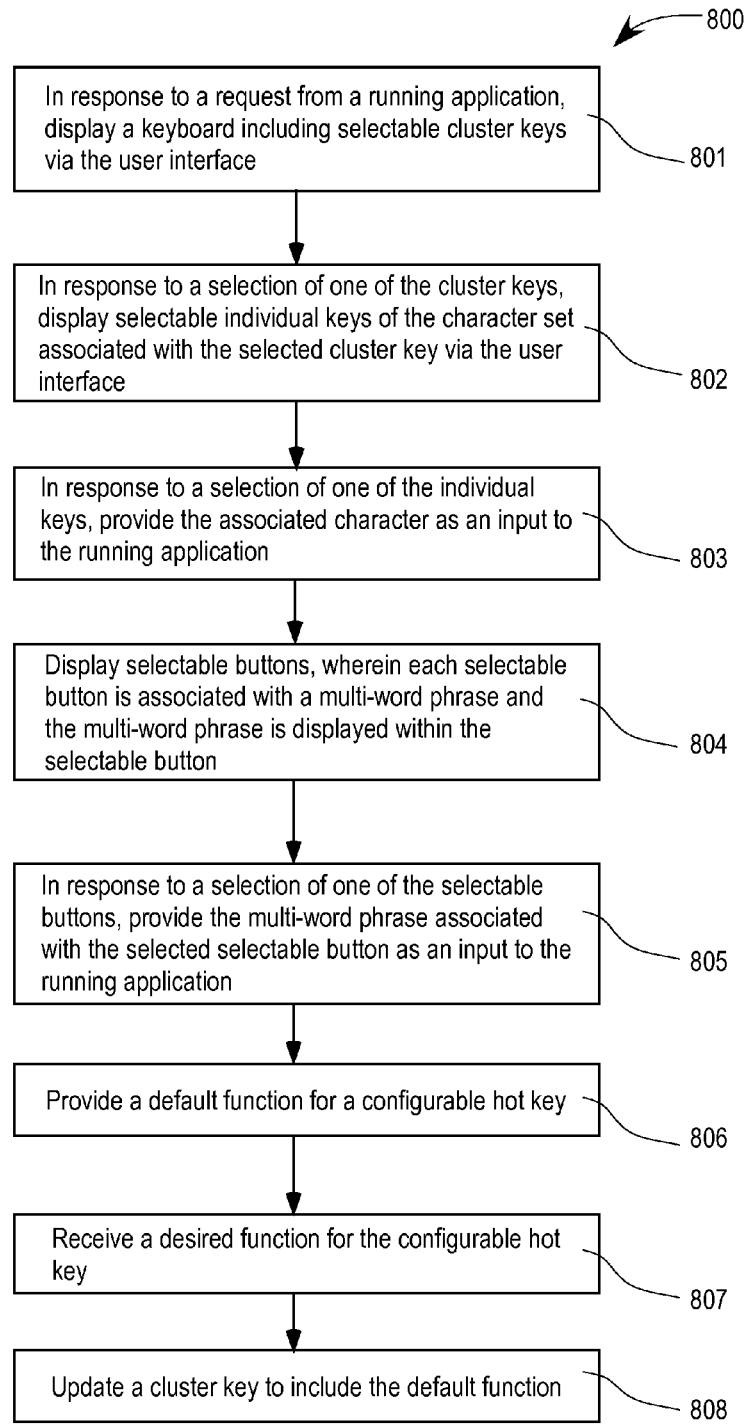
FIG. 8 is an example method for providing an accessible keyboard.

Turning to FIG. 8, a method for providing an accessible keyboard 800 is shown. The method 800 may be executed by a controller 103 to provide an accessible keyboard application 20. The method 800 may include the steps that cause the controller to: at step 801, in response to a request from a running application, display a keyboard including selectable cluster keys via the user interface; at step 802, in response to a selection of one of the cluster keys, display selectable individual keys of the character set associated with the selected cluster key via the user interface; at step 803, in response to a selection of one of the individual keys, provide the associated character as an input to the running application; at step 804, display selectable buttons, wherein each selectable button is associated with a multi-word phrase and the multi-word phrase is displayed within the selectable button; at step 805, in response to a selection of one of the selectable buttons, provide the multi-word phrase associated with the selected selectable button as an input to the running application; at step 806, provide a default function for a configurable hot key; at step 807, receive a desired function for the configurable hot key; and at step 808, update a cluster key to include the default function.

As described herein, the accessible keyboard application 20 provides an input to a running application 60. It will be understood by those of skill in the art that the accessible keyboard application 20 may be used to provide an input for any request for character inputs, and that the use of the term "running application" is not meant to limit the use of the accessible keyboard application 20 to any particular input case. As will further be appreciated by those of skill in the art, the accessible keyboard application 20 may be used to provide input in a wide variety of input scenarios, such as operating system application inputs, background application inputs, and the use of the term running application is meant to broadly encompass all user input scenarios involving a keyboard input.

Referring back to FIG. 2, the user device 30 may include a memory interface 102, controllers 103, such as one or more data processors, image processors and/or central processors, and a peripherals interface 106. The memory interface 102, the one or more controllers 103 and/or the peripherals interface 106 can be separate components or can be integrated in one or more integrated circuits. The various components in the user device 30 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 110, and positioning sensors 112 (e.g., GPS receiver, accelerometer) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 and an optical sensor 118 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 120, which can include radio frequency receivers and transmitters and/or optical (e.g., infrared) receivers and transmitters. The specific design and implementation of the communication subsystem 120 can depend on the communication network(s) over which the user device 30 is intended to operate. For example, the user device 30 can include communication subsystems 120 designed to operate over a GSM network, a GPRS network, an EDGE network, a Wi-Fi or Imax network, and a Bluetooth network. In particular, the wireless communication subsystems 120 may include hosting protocols such that the user device 30 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 may include a touch screen controller 130 and/or other input controller(s) 132. The touch-screen controller 130 can be coupled to a touch screen 134, such as a touch screen. The touch screen 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 may be coupled to memory 44. The memory 44 can include high-speed random access memory and/or non-volatile memory, such as one or more magnetic disk storage devices, one or more optical storage devices, and/or flash memory (e.g., NAND, NOR). The memory 44 may store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 44 may also store communication instructions 142 to facilitate communicating with one or more additional devices, one or more computers and/or one or more servers. The memory 44 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 44 may also store other software instructions controlling other processes and functions of the user device 30 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 44.

Each of the above identified instructions and applications can correspond to a set of instructions for performing one or more functions described herein. These instructions need not be implemented as separate software programs, procedures, or modules. The memory 44 can include additional instructions or fewer instructions. Furthermore, various functions of the user device 30 may be implemented in hardware and/or in software, including in one or more signal processing and/or application specific integrated circuits. Accordingly, the user device 30, as shown in FIG. 2, may be adapted to perform any combination of the functionality described herein.

Aspects of the systems and methods described herein are controlled by one or more controllers 103. The one or more controllers 103 may be adapted run a variety of application programs, access and store data, including accessing and storing data in associated databases, and enable one or more interactions via the user device 30. Typically, the one or more controllers 103 are implemented by one or more programmable data processing devices. The hardware elements, operating systems, and programming languages of such devices are conventional in nature, and it is presumed that those skilled in the art are adequately familiar therewith.

For example, the one or more controllers 103 may be a PC based implementation of a central control processing system utilizing a central processing unit (CPU), memories and an interconnect bus. The CPU may contain a single microprocessor, or it may contain a plurality of microcontrollers 103 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers 103 may further include appropriate input/output ports for interconnection with one or more output displays (e.g., monitors, printers, touch-screen 134, motion-sensing input device 108, etc.) and one or more input mechanisms (e.g., keyboard, mouse, voice, touch, bioelectric devices, magnetic reader, RFID reader, barcode reader, touchscreen 134, motion-sensing input device 108, etc.) serving as one or more user interfaces for the processor. For example, the one or more controllers 103 may include a graphics subsystem to drive the output display. The links of the peripherals to the system may be wired connections or use wireless communications.

Although summarized above as a PC-type implementation, those skilled in the art will recognize that the one or more controllers 103 also encompasses systems such as host computers, servers, workstations, network terminals, and the like. Further one or more controllers 103 may be embodied in a user device 30, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A non-transitory computer-readable medium in communication with a computer readable storage device for providing an accessible keyboard, the computer-readable medium including instructions that when executed by a controller in communication with a user interface, cause the controller to:
in response to a request from a running application, display a keyboard including selectable cluster keys via the user interface, wherein each cluster key is associated with a character set including two or more characters, wherein each displayed cluster key includes each character of the character set displayed within a boundary, wherein the characters displayed within each cluster key are positioned according to a QWERTY keyboard layout, wherein the characters displayed within each cluster key are positioned within at least one character row, wherein each character row is offset in relation to each other, wherein the cluster keys are positioned according to a QWERTY keyboard layout, wherein a first character set includes the characters 'q,' 'w,' 'e,' 'a,' 's,' and 'd,' a second character set includes the characters 'r,' 't,' 'y,' 'u,' 'f,' 'g,' and 'h,' a third character set includes the characters 'i,' 'o,' 'p,' 'j,' 'k,' and 'l,' a fourth character set includes the characters 'z,' 'x,' and 'c,' and a fifth character set includes the characters 'v,' 'b,' 'n,' and 'm';
in response to a selection of one of the cluster keys, display selectable individual keys of the character set associated with the selected cluster key via the user interface, wherein each individual key is associated with a single character of the character set associated with the selected cluster key; and,
in response to a selection of one of the individual keys, provide the associated character as an input to the running application.

2. The computer-readable medium for providing an accessible keyboard of claim 1, including further instructions that cause the controller to:
display selectable buttons, wherein each selectable button is associated with a multi-word phrase and the multi-word phrase is displayed within the selectable button; and
in response to a selection of one of the selectable buttons, provide the multi-word phrase associated with the selected selectable button as an input to the running application.

3. The computer-readable medium for providing an accessible keyboard of claim 1, including further instructions that cause the controller to:
provide a default function for a configurable hot key;
receive a desired function for the configurable hot key; and
update a cluster key to include the default function.

4. A non-transitory computer-readable medium in communication with a computer readable storage device for providing an accessible keyboard, the computer-readable medium including instructions that when executed by a controller in communication with a user interface, cause the controller to:
in response to a request from a running application, display a keyboard including selectable cluster keys via the user interface, wherein each cluster key is associated with a character set including two or more characters, wherein each displayed cluster key includes a displayed, non-selectable character for each character of the character set, wherein the characters displayed within each cluster key are positioned according to a QWERTY keyboard layout, wherein the characters displayed within each cluster key are positioned within at least one character row, wherein each character row is offset in relation to each other, wherein the cluster keys are positioned according to a QWERTY keyboard layout, wherein a first character set includes the characters 'q,' 'w,' 'e,' 'a,' 's,' and 'd,' a second character set includes the characters 'r,' 't,' 'y,' 'u,' 'f,' 'g,' and 'h,' a third character set includes the characters 'i,' 'o,' 'p,' 'j,' 'k,' and 'l,' a fourth character set includes the characters 'z,' 'x,' and 'c,' and a fifth character set includes the characters 'v,' 'b,' 'n,' and 'm';
in response to a selection of one of the cluster keys, display selectable individual keys of the character set associated with the selected cluster key via the user interface, wherein each individual key is associated with a single character of the character set associated with the selected cluster key; and,
in response to a selection of one of the individual keys, provide the associated character as an input to the running application.

5. The computer-readable medium for providing an accessible keyboard of claim 4, including further instructions that cause the controller to:
display selectable buttons, wherein each selectable button is associated with a multi-word phrase and the multi-word phrase is displayed within the selectable button; and
in response to a selection of one of the selectable buttons, provide the multi-word phrase associated with the selected selectable button as an input to the running application.

6. The computer-readable medium for providing an accessible keyboard of claim 4, including further instructions that cause the controller to:
provide a default function for a configurable hot key;
receive a desired function for the configurable hot key; and
update a cluster key to include the default function.

7. A system for providing an accessible keyboard, comprising:
a user interface;
a controller in communication with the user interface; and
a computer-readable medium including instructions, that when executed by the controller, cause the controller to:
in response to a request from a running application, display a keyboard including selectable cluster keys via the user interface, wherein each cluster key is associated with a character set including two or more characters, wherein each displayed cluster key includes each character of the character set displayed within a boundary, wherein the characters displayed within each cluster key are positioned according to a QWERTY keyboard layout, wherein the characters displayed within each cluster key are positioned within at least one character row, wherein each character row is offset in relation to each other, wherein the cluster keys are positioned according to a QWERTY keyboard layout, wherein a first character set includes the characters 'q,' 'w,' 'e,' 'a,' 's,' and 'd,' a second character set includes the characters 'r,' 't,' 'y,' 'u,' 'f,' 'g,' and 'h,' a third character set includes the characters 'i,' 'o,' 'p,' 'j,' 'k,' and 'l,' a fourth character set includes the characters 'z,' 'x,' and 'c,' and a fifth character set includes the characters 'v,' 'b,' 'n,' and 'm';

in response to a selection of one of the cluster keys, display selectable individual keys of the character set associated with the selected cluster key via the user interface, wherein each individual key is associated with a single character of the character set associated with the selected cluster key; and, in response to a selection of one of the individual keys, provide the associated character as an input to the running application.

8. The system for providing an accessible keyboard of claim 7, including further instructions that cause the controller to:

display selectable buttons, wherein each selectable button is associated with a multi-word phrase and the multi-word phrase is displayed within the selectable button; and in response to a selection of one of the selectable buttons, provide the multi-word phrase associated with the selected selectable button as an input to the running application.

9. The system for providing an accessible keyboard of claim 7, including further instructions that cause the controller to:

provide a default function for a configurable hot key;
receive a desired function for the configurable hot key; and
update a cluster key to include the default function.

\* \* \* \* \*